Figure 7:
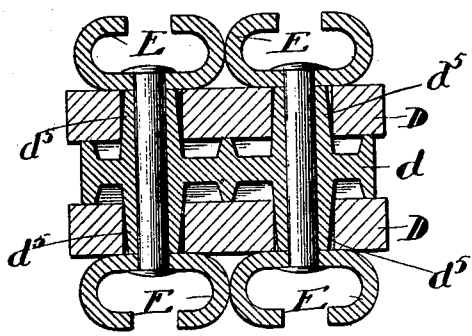

(No Model.) 4 Sheets—Sheet 1.
W. H. & F. A. WINSLOW.
BUILDING CONSTRUCTION.
No. 586,941. Patented July 20, 1897.
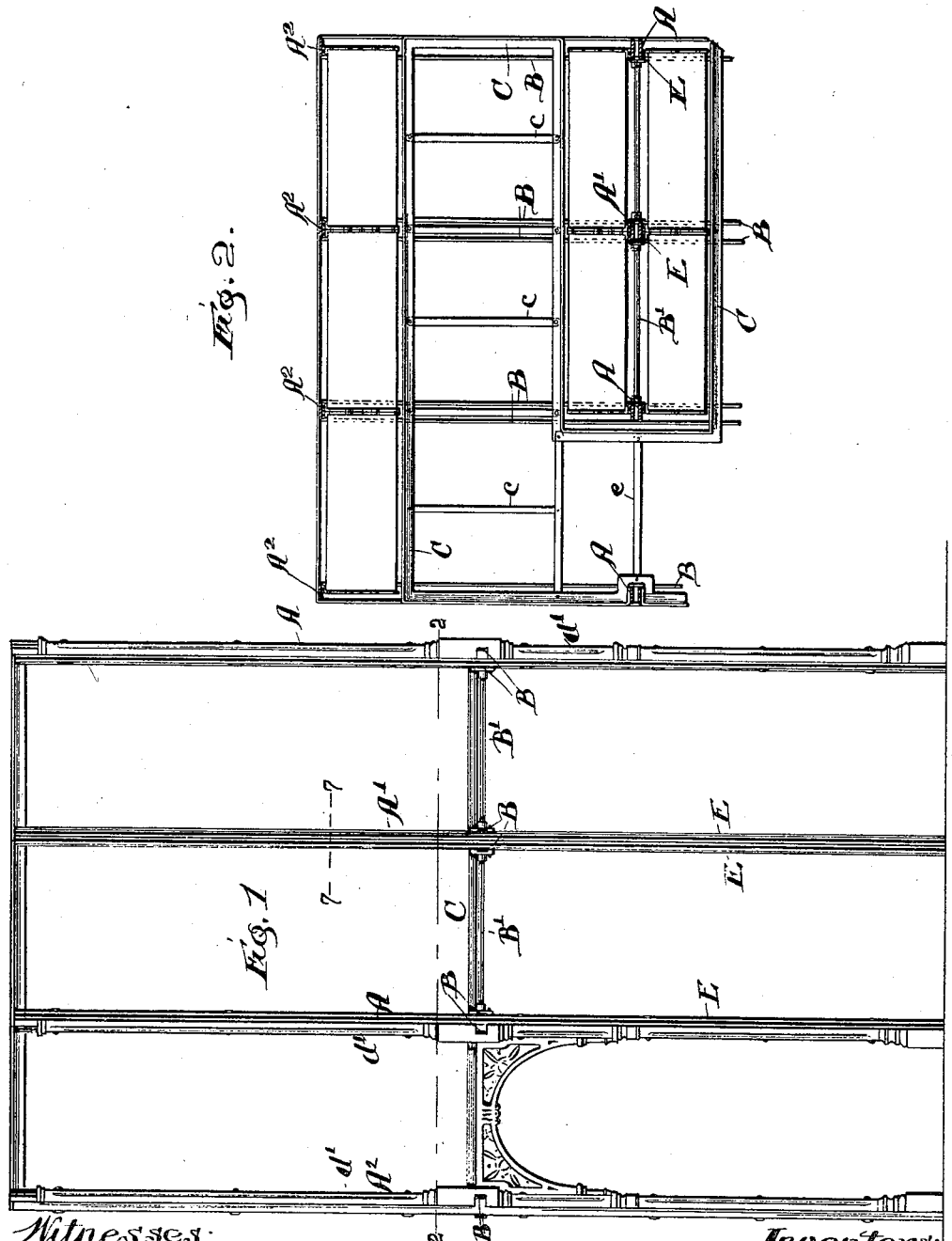
Witnesses:
Chas. O. Hervey
M. L. Sheahan
Inventors:
William H. Winslow
Francis A. Winslow
by Wheelwright & Bitner
their attys

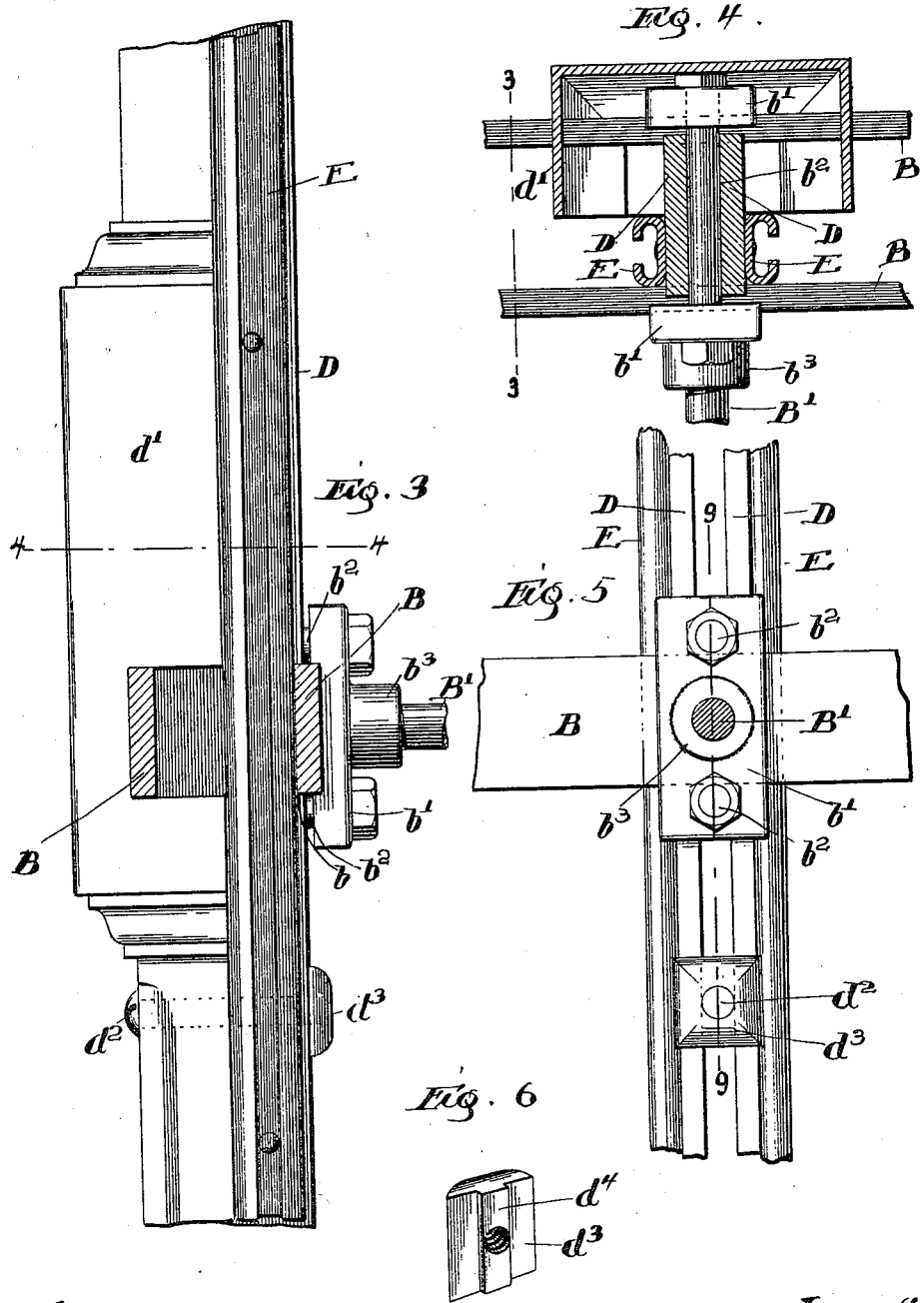

(No Model.) 4 Sheets—Sheet 3.

W. H. & F. A. WINSLOW.
BUILDING CONSTRUCTION.

No. 586,941. Patented July 20, 1897.

Witnesses:
Chas. O. Hervey
M. L. Sheahan.

Inventors:
William H. Winslow
Francis A. Winslow
By Miles Munroe Bettner
Their Attys.

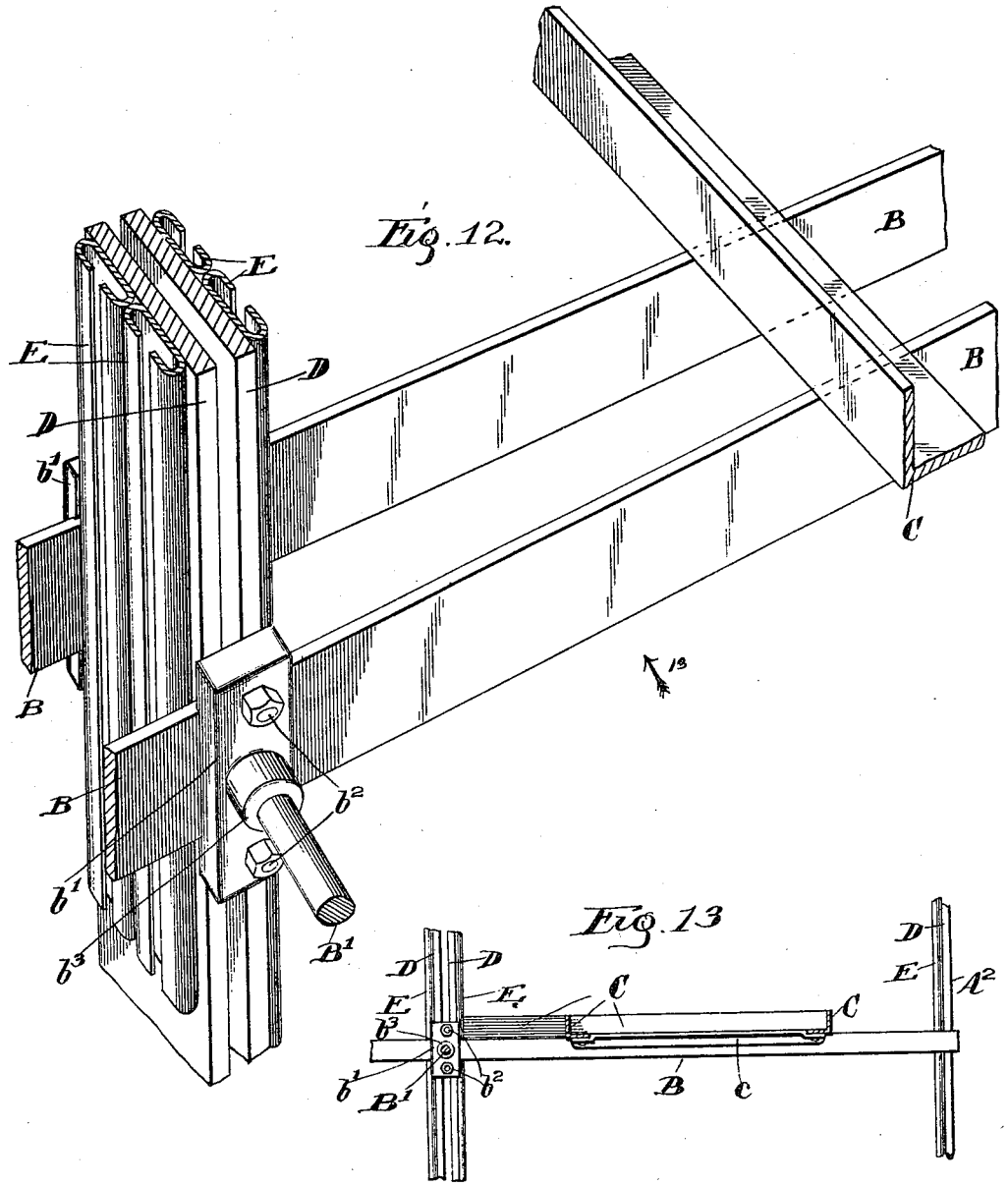

UNITED STATES PATENT OFFICE.

WILLIAM H. WINSLOW AND FRANCIS A. WINSLOW, OF CHICAGO, ILLINOIS.

BUILDING CONSTRUCTION.

SPECIFICATION forming part of Letters Patent No. 586,941, dated July 20, 1897.

Application filed November 27, 1896. Serial No. 613,575. (No model.)

*To all whom it may concern:*

Be it known that we, WILLIAM H. WINSLOW and FRANCIS A. WINSLOW, citizens of the United States of America, residing at Chicago, in the county of Cook and State of Illinois, have invented certain new and useful Improvements in Building Construction, of which the following is a specification.

Our invention relates to certain improvements in building construction, and more particularly to constructing library-stacks, such as are used in large libraries, &c.; and to such end it consists in certain novel features and combinations, as will be fully described in this specification and more particularly pointed out in the claims.

The invention is fully illustrated in the drawings presented herewith, in which—

Figure 8:
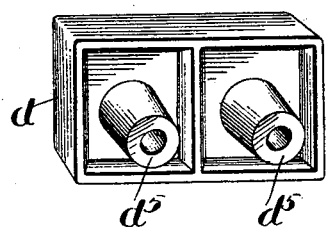
Figure 9:
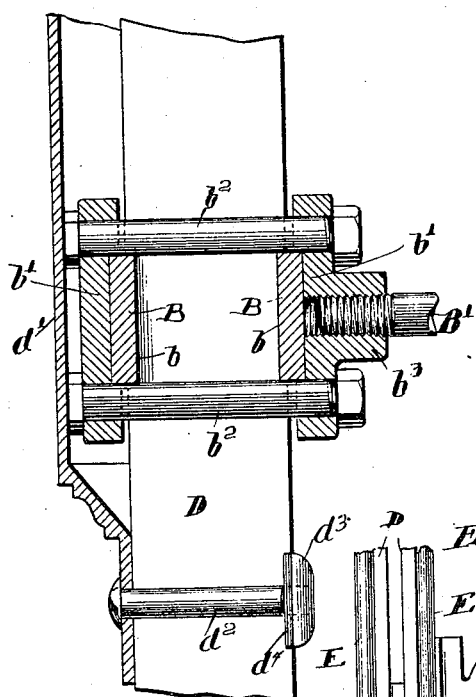
Figure 10:
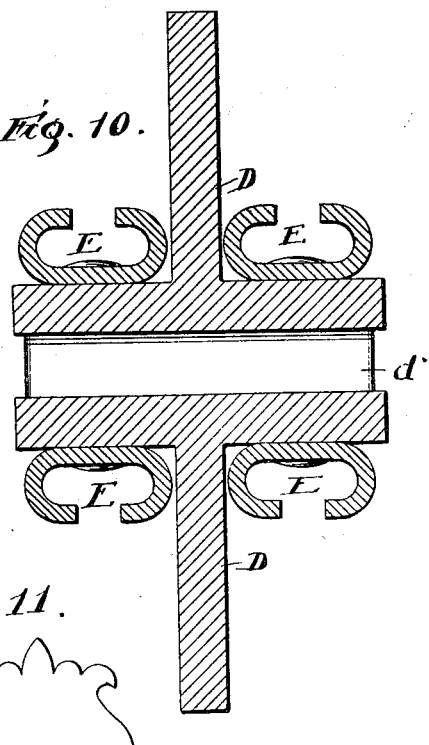
Figure 11:
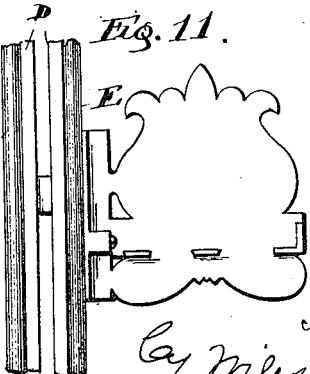

Figure 1 is a side elevation of a number of stacks. Fig. 2 is a plan view of the same, partly in section, the vertical columns being cut in line 2 2, Fig. 1. Fig. 3 is a detail view of a portion of one of the columns, partly in side elevation and partly in section, the section being taken through the line 3 3, Fig. 4. Fig. 4 is a detail horizontal section of the columns shown in Fig. 3, the line of section being taken at 4 4 in said figure. Fig. 5 is a side view of the column shown in Figs. 3 and 4, the tie-rod B' being shown in cross-section. Fig. 6 is a detail perspective view of a nut used in securing the ornamental facing to the vertical columns. Fig. 7 is a detail cross-section in line 7 7, Fig. 1. Fig. 8 is a detail perspective view of a washer used in connection with this construction. Fig. 9 is a detail vertical cross-section through the line 9 9, Fig. 5. Fig. 10 is a detail cross-section of a modification of the columns used in the construction. Fig. 11 is a side view of a bracket and portion of the column. Fig. 12 is a broken perspective of one of the supporting-columns, horizontal supporting members, and a floor-carrying member; and Fig. 13 is a side view of said vertical supporting-column and horizontal supporting members, looking in the direction indicated by the arrow 13, but showing in addition a column such as is used adjacent to the walls, also in side elevation, and a pair of floor-carrying members, said floor-carrying members being shown in vertical cross-section.

Looking at Figs. 1 and 2, which represent skeleton views of a portion of the library construction, the vertical supporting-columns will be seen at A A' A², the columns A representing such columns as will come in the aisles, and therefore being preferably provided with ornamental faces, as shown at d', secured to them in the manner hereinafter described, the columns A' representing columns interposed between the aisles, and the columns A² representing those arranged adjacent to the walls of the building. The horizontal supporting members are represented at B B, and, as shown, extend from the wall-columns A² to the columns A A', and, obviously, may be extended across the entire building, if desired, they evidently being supported at suitable intervals by such columns like those represented at A A'. Upon the supporting members B B are secured angle-irons C, the same being adapted to receive and support the flooring, and, as shown, are arranged so as to leave a space between the columns and the flooring approximately equal to the width of the shelves. The flooring such as is used in libraries is generally constructed of glass, &c., thereby allowing as much light as possible in the passage-ways. In order to insure a more perfect support for this class of flooring, we have shown connecting-beams c secured to the angle-irons, the upper surface being made flush with that of the lower flange of the angle-irons.

The arrangement shown in Figs. 1 and 2 is that of a number of stacks placed in the corner of a room, and shows two stories, the upper story being obviously reached by means of a stairway placed at any suitable point. The stacks may, however, be arranged along the room at will by using such material and stock as has been described.

In the above the general arrangement of the construction has been described, and we will now endeavor to specifically describe the portions which make up these various columns and supporting members in detail.

Looking at Figs. 3, 4, 5, and 9, which represent a column used adjacent to an aisle, it will be seen to consist of two vertical bars D D, spaced apart by washers d, (see Fig. 8,) in order to give more strength and rigidity to the column. Inasmuch as the columns A are arranged adjacent to the aisle, we have provided ornamental facings $d'$, which extend partly around the columns to give a more finished and ornamental appearance thereto. In securing the facings to the uprights bolts or screws $d^2$ are passed through the front of the facings and between the bars D D, nuts $d^3$ being provided upon the inner edges to clamp the parts together. As seen in the drawings, the nuts $d^3$ are provided with lugs $d^4$, which project into the space between the bars D D, thus preventing the rotation of the nut while the screw is being tightened. The screws $d^2$ are placed at suitable intervals along the uprights A, a sufficient number being used to clamp the facings firmly to the uprights.

Upon the outer faces of the vertical bars D D are secured channel-irons E E, adapted to receive and support the shelf-brackets, which carry the shelves, said brackets being provided with suitable clamping devices for adjustably securing them at any point upon the channel-iron, the exact mode of securing the brackets to the uprights not being important, so far as this invention is concerned. The aisle-columns shown in Figs. 3, 4, 5, and 9 are provided with one channel-iron on each outer face of the bars, but the intervening columns A' are necessarily provided with two sets for supporting the shelves at each end. The wall-columns $A^2$ are constructed of a single bar of channel-iron and supporting-bar D at the corners or at the aisles, the columns between being obviously provided with two channel-irons, as seen in Fig. 2. These channel-irons extend the entire length of the uprights, and the shelf-brackets are arranged along the same at suitable intervals to accommodate themselves to the height of the books. The means for securing the channel-irons to the vertical bars D D is best seen in Figs. 8 and 9, which show one of the washers $d$ that is used in spacing the bars apart and also in riveting the channel-irons to the same. The washer $d$ is provided with two sets of oppositely-arranged bosses $d^5$, and the bars D D are provided with holes of a diameter to allow the bosses to fit in the same. The channel-irons are provided with holes somewhat smaller than the bosses, the bosses also being provided with similar holes, and rivets are passed through these small holes in the bosses and channel-irons and headed, thus clamping all the parts firmly together and evidently making an extremely strong supporting-column, besides forming a very convenient way for securing the shelf-brackets to the uprights.

The horizontal supporting-bars B B are secured to the uprights by forming notches or seats $b$ in the bars D D, in which the horizontal bars are placed, clamping-plates $b'$ being placed upon the outer faces of the bars B B and connected by bolts $b^2$, which pass between the bars D D, one being above and one below the horizontal bars. This forms a very simple and extremely strong and effective clamping device for securing the horizontal members to the vertical members, and the recesses or seats in the vertical bars may evidently be formed at the proper place determined by the height of the story. The clamping-plates $b'$ are provided with bosses $b^3$, internally screw-threaded, and screw-threaded tie-rods B' are provided to connect the clamping-plates, thus rigidly and securely bracing the entire structure. The horizontal bars B B are suitably fastened to the wall-columns $A^2$, and may extend across the entire room, if desired, they being supported upon the upright columns, which are spaced apart, so as to give the necessary room for aisles, shelves, &c.

It will thus be seen that the entire structure is extremely light and substantial and is especially adapted for use in large libraries where great numbers of shelves and stories are required.

Fig. 10 shows a slight modification in the construction of the upright column. This construction is used when more than two stories are to be built, the difference being simply that in place of the bars D D T-irons are used, the channel-irons being arranged on either side of the lateral member of the T. We have found that by using a T-iron in place of the ordinary bar-iron, when a great number of stories are to be built, it greatly adds to the lateral rigidity of the upright and makes a more substantial framework.

In making up the stock for this construction the uprights are made in suitable lengths, and the seats $b$ can evidently be formed at any point along them, according to the height of the stories desired.

We claim as new and desire to secure by Letters Patent—

1. A building construction for libraries, &c., comprising suitable vertical supporting-columns, horizontal floor-supporting members, clamps for securing the floor-supporting members to the vertical columns, tie-rods connecting the clamps, and channel-irons secured to the vertical columns and adapted to receive and support the shelf-brackets.

2. A building construction comprising suitable vertical supporting-columns, floor-beams adjustably secured upon the vertical columns, said vertical columns being made up of bars arranged side by side and separated by suitable washers, and channel-irons fastened to the bars and adapted to support shelf-brackets.

3. The combination with the vertical bars, D, D, having the notches, $b$, in the edges thereof, of the horizontal floor-beams, B, B, a clamp for securing the horizontal members to the vertical bars comprising substantially plates, $b'$, $b'$, arranged upon the outer faces of the horizontal members, and bolts passing between the bars, D, D, and connecting the clamps; substantially as described.

4. The combination with the vertical supporting-columns consisting of the bars, D, D, having the notches, $b$, $b$, and the channel-irons, E, E, secured to the bars, D, D, and adapted to receive and support the shelf-brackets, of the horizontal floor-beams, B, B, resting in the notches, $b$, $b$, clamping-plates, $b'$, embracing the outer faces of the floor-beams, B, B, bolts connecting the clamping-plates and passing between the bars, D, D, and the tie-rods, B', connecting the oppositely-arranged clamping-plates; substantially as described.

5. A library construction comprising vertical supporting-bars, D, D, and channel-irons, E, E, adapted to support shelf-brackets, the bars, D, D, having notches in their edges, floor-beams resting in said notches, clamps adapted to secure the floor-beams to the vertical supporting-bars, D, D, and shelf-brackets adjustably secured upon the channel-irons.

6. The combination with suitable vertical supporting-columns, consisting of bars, D, D, arranged side by side and suitably spaced apart, and channel-irons secured thereon and adapted to receive and support shelf-brackets, of floor-beams adjustably secured to the supporting-bars, D, D, and the angle-irons, C, C, arranged upon the floor-beams and adapted to receive and support the flooring; substantially as described.

7. In a device of the class described, the combination with a pair of horizontally-extending supporting-beams, B, B, of a vertical supporting-column and a clamping device adapted to secure the horizontal beams to the column, said column comprising substantially two longitudinal bars, D, D, channel-irons, E, E, adapted to support shelf-brackets, washers, $d$, $d$, adapted to space the bars, D, D, apart and having the bosses, $d^5$, extending through the bars, and rivets passing through said bosses and channel-irons and clamping all the parts together; substantially as described.

In witness whereof we have hereunto set our hands this 17th day of June, 1896.

WILLIAM H. WINSLOW.
FRANCIS A. WINSLOW.

Witnesses:
CHARLES P. SAXE,
C. J. WILSON.